(12) United States Patent
Taherzadeh Boroujeni et al.

(10) Patent No.: US 11,706,751 B2
(45) Date of Patent: Jul. 18, 2023

(54) BASE STATION CONTROLLED TEMPORAL FILTERING OF CHANNEL STATE INFORMATION

(71) Applicant: QUALCOMM Incorporated, San Diego, CA (US)

(72) Inventors: Mahmoud Taherzadeh Boroujeni, San Diego, CA (US); Tao Luo, San Diego, CA (US); Wooseok Nam, San Diego, CA (US); Junyi Li, Franklin Park, NJ (US); Jelena Damnjanovic, Del Mar, CA (US); Iyab Issam Sakhnini, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 17/145,266

(22) Filed: Jan. 8, 2021

(65) Prior Publication Data

US 2022/0224494 A1   Jul. 14, 2022

(51) Int. Cl.
| | |
|---|---|
| H04B 7/0408 | (2017.01) |
| H04B 17/24 | (2015.01) |
| H04L 1/00 | (2006.01) |
| H04L 5/00 | (2006.01) |
| H04W 24/08 | (2009.01) |
| H04W 24/10 | (2009.01) |
| H04W 72/04 | (2023.01) |
| H04W 84/02 | (2009.01) |

(Continued)

(52) U.S. Cl.
CPC ........ *H04W 72/046* (2013.01); *H04B 7/0408* (2013.01); *H04B 17/24* (2015.01); *H04L 1/0026* (2013.01); *H04L 1/0035* (2013.01); *H04L 5/0057* (2013.01); *H04L 5/0091* (2013.01); *H04W 24/08* (2013.01); *H04W 24/10* (2013.01); *H04W 72/54* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ... H04B 7/02–12; H04B 17/0082–3913; H04J 11/0023–0093; H04J 2011/0003–0096; H04L 1/0001–248; H04L 5/0001–0098; H04W 8/22–245; H04W 16/02–32; H04W 24/02–10; H04W 28/02–26; H04W 36/0005–385; H04W 48/02–20; H04W 56/0005–0095; H04W 72/005–14; H04W 74/002–008; H04W 84/02–16; H04W 88/02–12; H04W 92/02; H04W 92/04; H04W 92/10
See application file for complete search history.

(56) References Cited

U.S. PATENT DOCUMENTS

| | | | |
|---|---|---|---|
| 2018/0124766 A1* | 5/2018 | Nagaraja | H04W 72/046 |
| 2019/0110299 A1* | 4/2019 | Kim | H04W 72/085 |
| 2019/0140726 A1* | 5/2019 | Cirkic | H04W 24/10 |

\* cited by examiner

*Primary Examiner* — Timothy J Weidner
(74) *Attorney, Agent, or Firm* — Arent Fox, LLP

(57) ABSTRACT

A base station determines a temporal filter configuration for a user equipment (UE) and transmits the temporal filter configuration to the UE. The temporal filter configuration indicates whether the UE should apply a temporal filter to channel state information (CSI) measurements to generate CSI values, or identifies which temporal filter to apply. The UE generates CSI values based on the temporal filter configuration and reports the generated CSI values to the base station.

26 Claims, 10 Drawing Sheets

(51) Int. Cl.
*H04W 88/02* (2009.01)
*H04W 88/08* (2009.01)
*H04W 92/02* (2009.01)
*H04W 92/10* (2009.01)
*H04W 72/044* (2023.01)
*H04W 72/54* (2023.01)

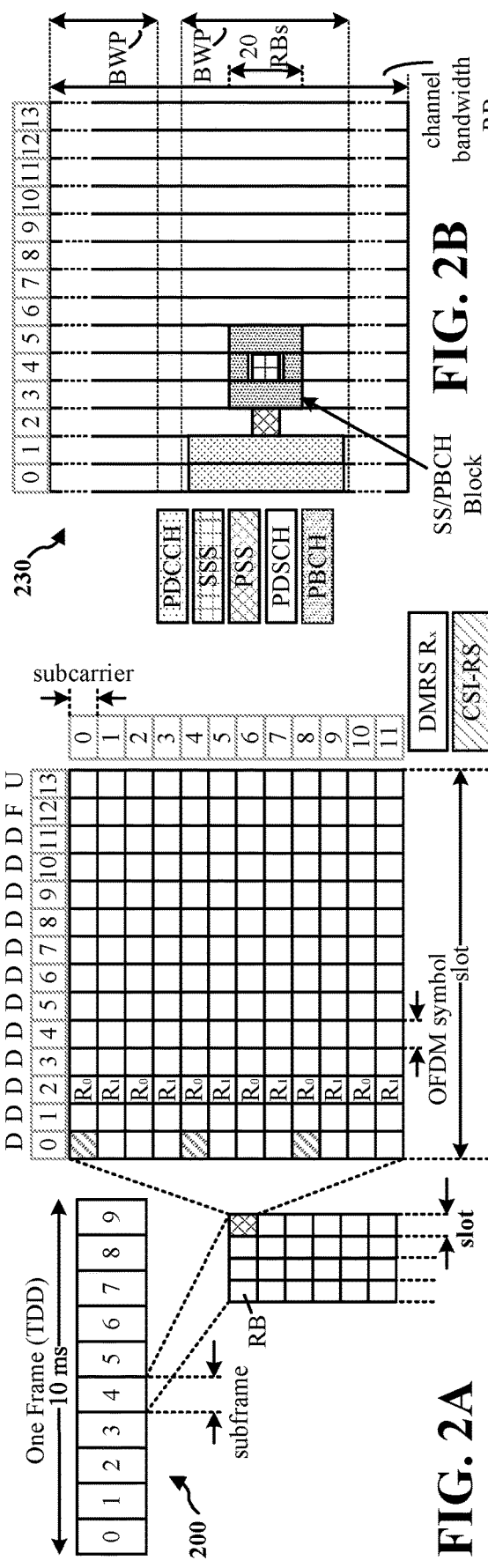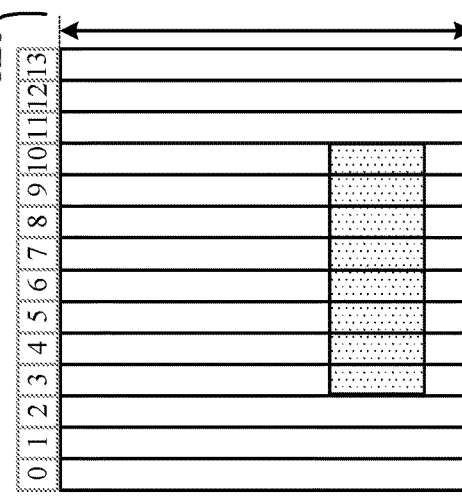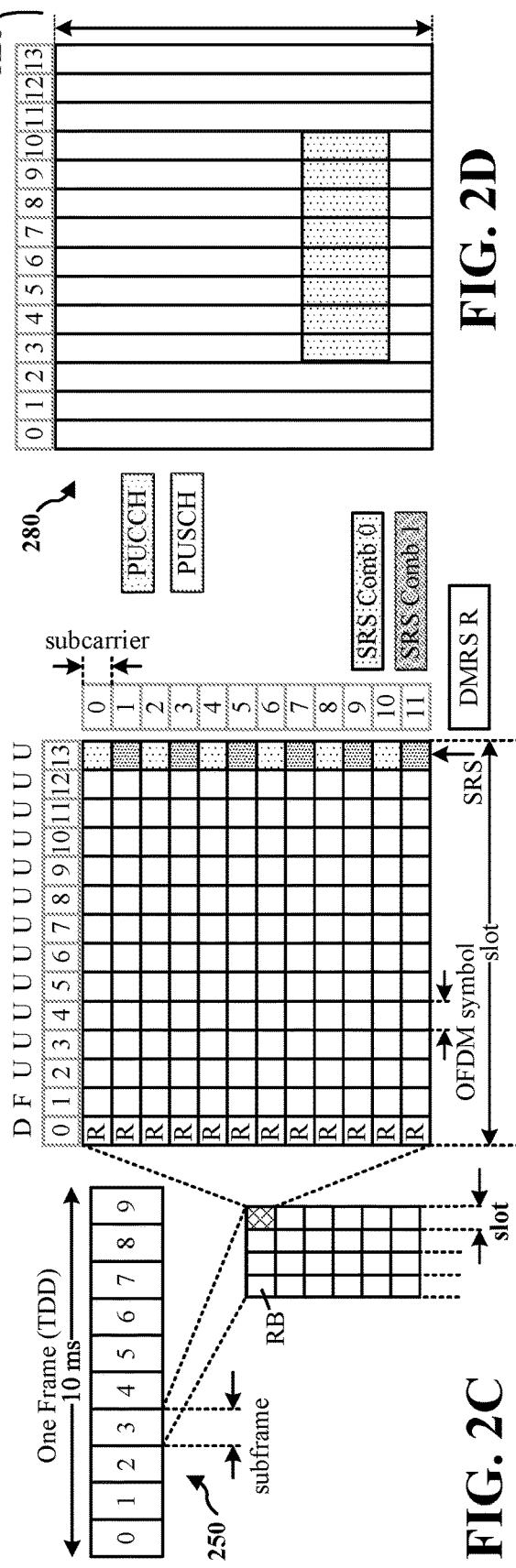
FIG. 2A  FIG. 2B  FIG. 2C  FIG. 2D

BASE STATION CONTROLLED TEMPORAL FILTERING OF CHANNEL STATE INFORMATION

BACKGROUND

Technical Field

The present disclosure relates generally to communication systems, and more particularly, to a wireless communication system with base station controlled temporal filtering of channel state information.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The UE may receive, from a base station, a temporal filter configuration, and transmit, to the base station, a channel state information (CSI) value, the CSI value being based on the temporal filter configuration.

In some aspects, whether the UE applies a temporal filter to a CSI measurement to generate the CSI value is based on the temporal filter configuration.

In some aspects, the temporal filter configuration identifies a temporal filter and the UE applies the identified temporal filter to a CSI measurement to generate the CSI value.

In some aspects, applying the temporal filter includes generating the CSI value based on the CSI measurement and a previous CSI measurement.

In some aspects, the UE is configured with a plurality of temporal filters, the temporal filter configuration identifies a temporal filter of the plurality of temporal filters, and the UE applies the identified temporal filter to a CSI measurement to generate the CSI value.

In some aspects, the CSI value is a signal to noise and interference ratio (SINR) value based on one or more SINR measurement or a reference signal received power (RSRP) value based on one or more RSRP measurement.

In some aspects, transmitting the CSI value includes transmitting a L1-signal to noise and interference ratio (SINR) report or a L1-reference signal received power (RSRP) report.

In some aspects, the temporal filter configuration is based on hybrid automatic repeat request (HARQ) reports of the UE, a rate of change in CSI values reported by the UE, a rate of change in channel quality information (CQI) values reported by the UE, or an uplink quality of the UE.

In some aspects, the UE may receive, from the base station, a beam selection based on the CSI value.

In some aspects, the beam selection is based on a first beam selection algorithm if the temporal filter configuration configures the UE to apply a temporal filter to generate the CSI value and is based on a second beam selection algorithm if the temporal filter configuration configures the UE to report a CSI measurement as the CSI value without applying a temporal filter.

In some aspects, transmitting the CSI value includes transmitting a CSI report, and the UE may select a beam corresponding to the CSI value from a plurality of beams for inclusion in the CSI report based on the CSI value.

In another aspect of the disclosure, a method, a computer-readable medium, and an apparatus are provided. The apparatus may be a base station. The base station may transmit, to a user equipment (UE), a temporal filter configuration, and receive, from the UE, a channel state information (CSI) value, the CSI value being based on the temporal filter configuration.

In some aspects, whether the CSI value is based on a temporal filter is based on the temporal filter configuration.

In some aspects, the temporal filter configuration identifies a temporal filter and the CSI value is generated by applying the temporal filter to a CSI measurement.

In some aspects, applying the temporal filter includes generating the CSI value based on the CSI measurement and a previous CSI measurement.

In some aspects, the UE is configured with a plurality of temporal filters, the temporal filter configuration identifies a temporal filter of the plurality of temporal filters, and the CSI value is generated by applying the identified temporal filter to a CSI measurement.

In some aspects, the CSI value is a signal to noise and interference ratio (SINR) value based on one or more SINR measurement or a reference signal received power (RSRP) value based on one or more RSRP measurement.

In some aspects, transmitting the CSI value includes transmitting a L1-signal to noise and interference ratio (SINR) report or a L1-reference signal received power (RSRP) report.

In some aspects, the temporal filter configuration is based on hybrid automatic repeat request (HARQ) reports of the UE, a rate of change in CSI values reported by the UE, a rate of change in channel quality information (CQI) values reported by the UE, or an uplink quality of the UE.

In some aspects, the base station may transmit, to the UE, a beam selection based on the CSI value.

In some aspects, the beam selection is based on a first beam selection algorithm if the temporal filter configuration configures the UE to apply a temporal filter to generate the CSI value and is based on a second beam selection algorithm if the temporal filter configuration configures the UE to report a CSI measurement as the CSI value without applying a temporal filter.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G NR frame, DL channels within a 5G NR subframe, a second 5G NR frame, and UL channels within a 5G NR subframe, respectively.

DETAILED DESCRIPTION

Figure 1:
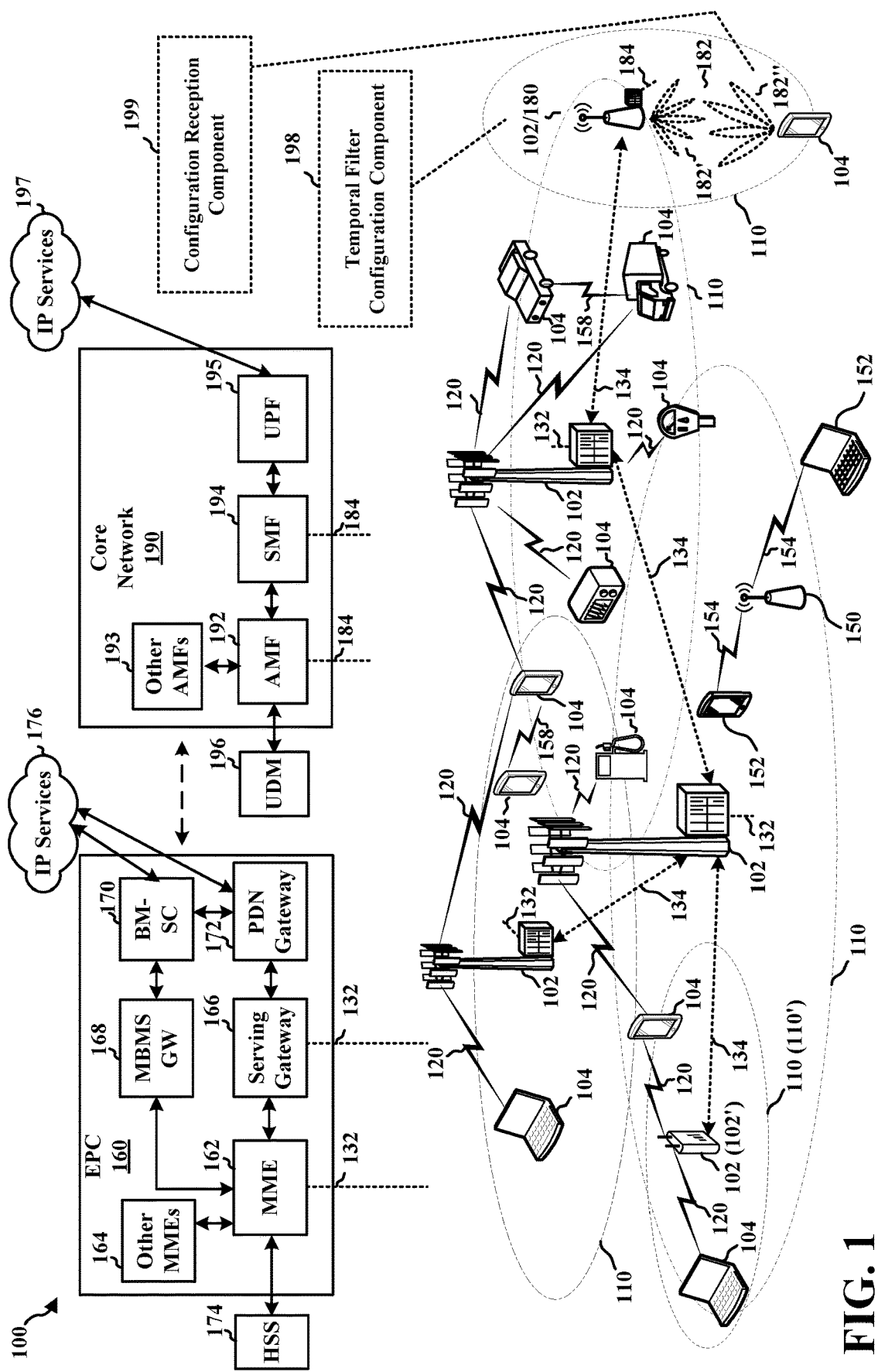
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may include a temporal filter configuration component 198 configured to determine a temporal filter configuration for a UE and to transmit the temporal filter configuration to the UE. In certain aspects, the UE 104 may include a configuration reception component 199 configured to receive a temporal filter configuration and to generate CSI values based on the temporal filter configuration. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
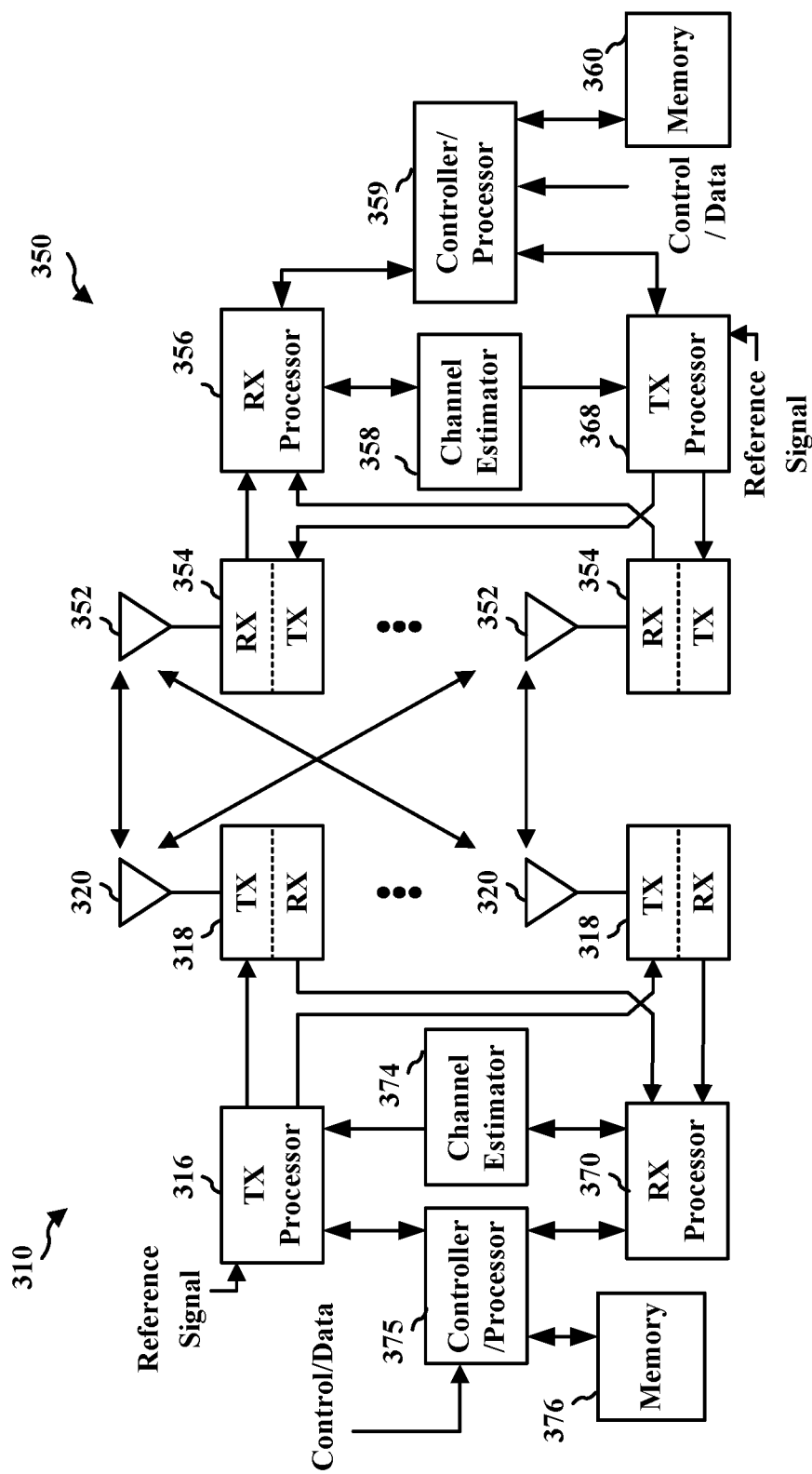
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Figure 4:
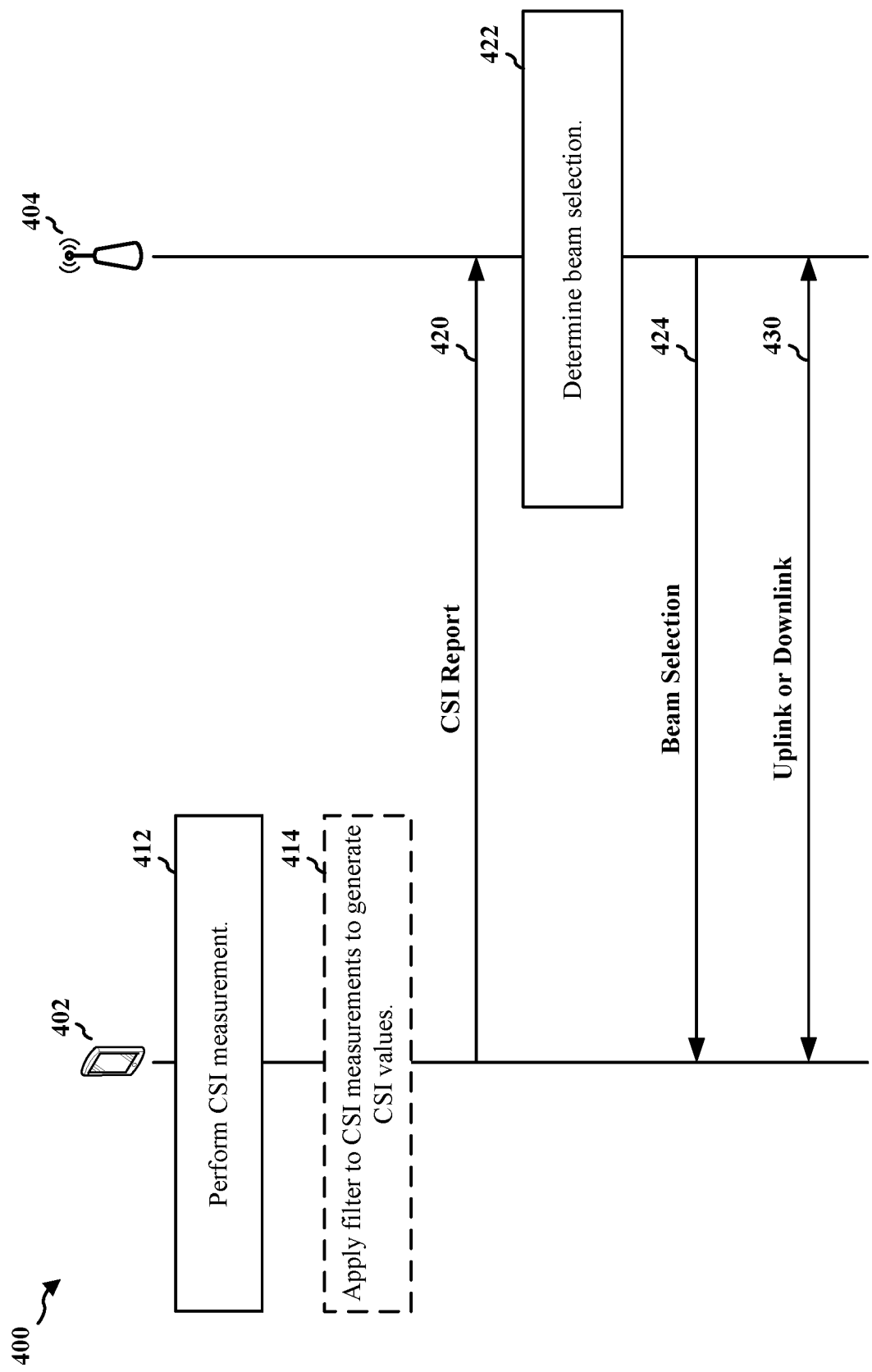
FIG. 4 is a communication flow diagram 400 illustrating CSI reporting and beam selection.

FIG. 4 is a communication flow diagram 400 illustrating CSI reporting and beam selection. A UE 402 may communicate with a base station 404 using a particular beam or beams for uplink or downlink. As illustrated at 412, the UE 402 may perform CSI measurement. The UE 402 may take measurements for different beams representative of the quality of the channel for that beam. For example, the UE 402 may measure the signal to noise and interference ratio (SINR), the reference signal received power (RSRP), the received signal strength indicator (RSSI), reference signal received quality (RSRQ) for various beams.

As illustrated at 414, the UE 402 may apply a temporal filter to the CSI measurements for a beam to generate a CSI value to report for that beam. Some UEs may simply report the measured CSI value for a beam. Some UEs may modify the CSI measurements, by applying a temporal filter, and report the filtered CSI measurement. Whether a temporal filter is applied and what temporal filter is applied is a matter of UE implementation.

As illustrated at 420, the UE 402 transmits a CSI report 420 to the base station 404 and the base station 404 receives the CSI report 420. The CSI report 420 includes CSI values for corresponding beams. If the UE 402 did not apply a temporal filter at 414, the CSI values will be the CSI measurements taken at 412. If the UE 402 applied a temporal filter at 414, the CSI values may be representative of the channel for the beam and may be based on the CSI measurements taken at 412, but will be determined by the temporal filter.

As illustrated at 422, the base station 404 determines a beam selection for the UE 402. The base station 404 will select a beam for uplink and/or downlink communication between the base station 404 and the UE 402. The base station 404 may select the beam, at least in part, based on the CSI values for the beams received in the CSI report 420. The base station 404 may transmit the beam selection 424 to the UE 402 (e.g., in a beam report) and the UE 402 may receive the beam selection 424.

As illustrated at 430, the UE 402 may transmit uplink transmissions to the base station 404 on the beam identified in the beam selection 424 and the base station 404 may receive the uplink transmissions on the beam identified in the beam selection 424, and the base station 404 may transmit downlink transmissions to the UE 402 on the beam identified in the beam selection 424 and the UE 402 may receive the downlink transmissions on the beam identified in the beam selection 424.

Figure 5:
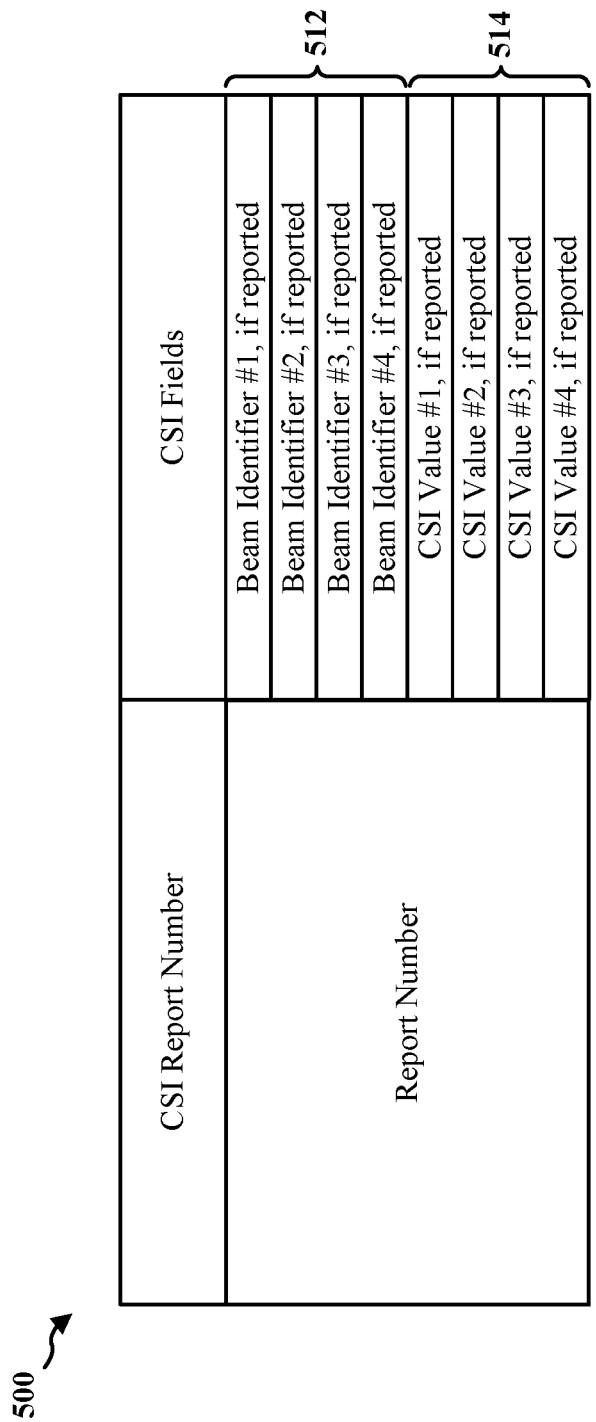
FIG. 5 is a diagram 500 illustrating a CSI report.

FIG. 5 is a diagram 500 illustrating a CSI report. A CSI report may include a report number field to identify the report. The CSI report may include a first set of fields 512 containing beam identifiers. The beam identifiers identify which beams the CSI report is providing CSI values for. For example, the beam identifier may be a CSI-RS resource indicator (CRI) or may be a SS/PBSCH Block Indicator (SSBRI).

The CSI report may include a second set of fields 514 containing CSI values. For example, the CSI value may be a channel quality indicator (CQI), a precoding matrix indicator (PMI), a strongest layer indication (SLI), a rank indication (RI), a RSRP such as L1-RSRP, or a SINR such as L1-SINR. Each field of the second set of fields 514 may correspond to a field in the first set of fields 512. The CSI value in a field is for the beam identified in the corresponding field.

In some aspects, each field in the second set of fields 514 may include the CSI value for the corresponding beam. In some other aspects, one of the fields (e.g., the first field) may include the CSI value for the corresponding beam, and some or all of the remaining fields may include a differential value, identifying how much the CSI value for that beam differs from the CSI value in the field that does not have a differential value.

A CSI report may have a limited number of fields, and may therefore only report CSI information for a limited number of beams. For example, the CSI report illustrated in the diagram 500 may only report CSI values for up to four beams. In some other examples, a CSI report may only include CSI information for one or two beams. A UE may have access to multiple beams and may have CSI information for multiple beams, but a CSI report may not have enough fields to report the CSI information for all of the multiple beams. The UE may select a subset of those beams to be included in the CSI report. For example, the UE may select the beams with the highest CSI values (e.g., the highest SINR or the highest RSRP) to be included in the CSI report.

In some environments, transient interference may cause a temporary reduction in channel quality for a beam. For example, the SINR for a beam may change drastically because of cross-link interference from other cells. This may especially true in indoor environments and/or environments with many close cells. Although a beam may experience a drop in channel quality based on a transient interference, that beam may still be the optimal beam for future scheduling. However, the transient drop in channel quality may result in a reduced CSI measurement, and the UE may not select the beam for inclusion in the CSI report. With the beam not being included in the CSI report, the base station may not be able to select the beam for scheduling or may not have reduced information at its disposal for making scheduling decisions.

Figure 6:
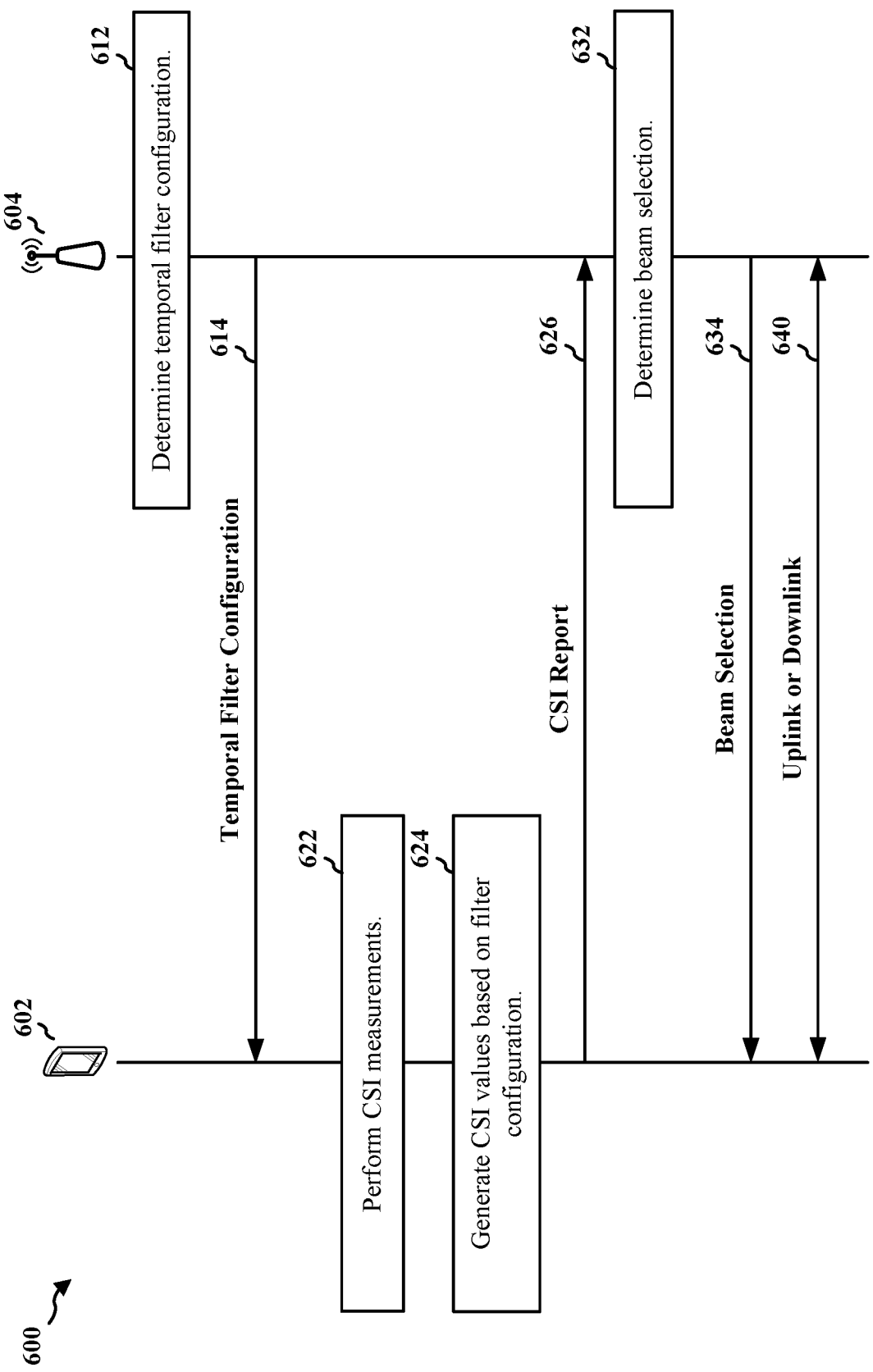
FIG. 6 is a communication flow diagram 600 illustrating CSI reporting and beam selection based on base station controlled filtering.

FIG. 6 is a communication flow diagram 600 illustrating CSI reporting and beam selection based on base station controlled temporal filtering. A UE 602 may communicate with a base station 604 using a particular beam or beams for uplink or downlink. The UE 602 may be configured with one or more temporal filter, and the base station 604 may configure whether the UE 602 will use a filter in CSI reporting or which filter the UE 602 will use in CSI reporting.

A temporal filter may be a filter which a UE applies to CSI measurements for a beam to generate a CSI value for that beam that is based on CSI measurements over time. One example of a temporal filter may be a weighted combination of the current CSI measurement and previous CSI measurements. For example, a filter may indicate that a CSI value for a beam should be $0.6*SINR^{NEW}+0.3*SINR^{LAST}+0.3*SINR^{LAST+1}$, where $SINR^{NEW}$ is the current SINR measurement for that beam, $SINR^{LAST}$ is the previous SINR measurement for that beam, and $SINR^{LAST+1}$ is the SINR measurement before $SINR^{LAST}$ for that beam.

A second example of a temporal filter may be a weighted combination of the current CSI measurement and the last reported CSI value. For example, a filter may indicate that a CSI value for a beam should be $0.7*SINR^{NEW}+0.3*SINR^{OLD}$, where $SINR^{NEW}$ is the current SINR measurement for that beam and $SINR^{OLD}$ is the last reported CSI value for that beam (which may also have been generated based on the filter).

A third example of a temporal filter may be the average of a CSI measurement over a time window (e.g., a set or configured time window corresponding to that temporal filter). For example, a filter may indicate that a CSI value for a beam should be the average measured SINR over the last 100 ms, or over the last 20 ms, or over the last 80 slots.

A fourth example of a temporal filter may be a reduction of a CSI measurement based on the standard deviation or variance of that CSI measurement. The standard deviation or variance may be calculated based on measurements of that CSI measurement during a set or configured time window, or based on a set or configured number of the most recent measurements. For example, a filter may indicate that a CSI value for a beam should be $SINR^{NEW}-X*SD(SINR)$, where SINRNEW is the current SINR measurement, SD(SINR) is the standard deviation of SINR measurements, and X is a set or configured coefficient.

Although the above examples use SINR as an example CSI measurement, the same filters may be applied to other CSI measurements such as RSRP.

As illustrated at 612, the base station 604 may determine a temporal filter configuration. A temporal filter configuration may set the behavior of a UE receiving the temporal filter configuration with respect to applying temporal filters. For example, a temporal filter configuration may indicate whether a temporal filter should be applied, which temporal filter should be applied, and/or what values to use in a temporal filter. In some aspects, a temporal filter configuration may indicate that a UE receiving the temporal filter configuration should apply a temporal filter to generate reported CSI values. In some aspects, a temporal filter configuration may also indicate that a UE receiving the temporal configuration should not apply a temporal filter to generate reported CSI values. In other aspects, a UE may default to applying a temporal filter or may default to not applying a temporal filter, and the temporal filter configuration may indicate to the receiving UE to switch from its default behavior.

In some aspects, a UE (such as the UE 602) may be configured with a single temporal filter, and the temporal filter configuration may simply indicate whether to use the single temporal filter. In other aspects, a UE (such as the UE 602) may be configured with multiple temporal filters, and the temporal filter configuration may identify which temporal filter to apply. In some aspects, a temporal filter configuration may indicate which temporal filter a receiving UE should apply or may indicate that the UE should not apply a temporal filter.

In some aspects, a temporal filter configuration may set values to be used in a temporal filter. For example, where a temporal filter applies weights to measurements or values to be combined, the temporal filter configuration may set those weights. Where a temporal filter determines an average, a standard deviation, or a variance over a certain time window, the temporal filter configuration may set the length of the time window.

In some aspects, the base station 604 may determine the temporal filter configuration at 612 based on values reported by UEs, or rates of change in those values, that may correspond to interference. For example, the base station 604 may determine the temporal filter configuration based on a history of HARQ reports, based on a rate of change in reported CSI values, and/or based on a rate of change in CQI reported. Whether a temporal filter should be applied, which temporal filter should be applied, and/or what values to use in a temporal filter may be set based on the values or reports. For example, if the base station 604 determines that the rate of change in CSI values is above a threshold value, the base station 604 may determine the temporal filter configuration to indicate that the UE should apply a temporal filter, or if the base station 604 determines that the rate of change in CSI values is within a specified range, the base station 604 may determine the temporal filter configuration to indicate that the UE should apply a specific temporal filter within that range. The base station 604 may determine the temporal filter configuration to set the length of the window used in an averaging temporal filter based on the rate of change in CSI values, setting a longer window where a higher rate of change is determined.

The base station 604 may determine the temporal filter configuration for a UE based on reports from that UE or based on reports from other UEs communicating with the base station 604. For example, in determining the temporal filter configuration for a first UE, the base station 604 may determine that other UEs in the area may be experiencing interference (e.g., are experiencing high rates of change in reported CSI values), and may determine the temporal filter configuration for the first UE based on the other UEs in the area experiencing interference.

In some aspects, the base station 604 may determine the temporal filter configuration at 612 based on values determined at the base station 604. For example, the base station 604 may determine the quality of uplink reception from a UE, and may determine the temporal filter configuration for that UE based on the quality of the uplink reception. As another example, the base station 604 may determine a ratio of retransmission requests received from a UE to the number of transmissions sent to the UE, and may determine the temporal filter configuration for that UE based on the ratio.

In some aspects, the UE 602 may be preconfigured with one or more temporal filter. For example, one or more temporal filter may be included in a standard and the UE 602 may be programmed to include the one or more filter based on the standard. The temporal filter configuration may include an indicator identifying a preconfigured temporal filter that should be used. In some aspects, a temporal filter configuration may additionally or alternatively include the temporal filter itself (e.g., a temporal filter that is not preconfigured for the UE 602).

Upon determining a temporal filter configuration for the UE 602, the base station 604 may transmit the temporal filter configuration 614 to the UE 602 and the UE 602 may receive the temporal filter configuration 614. In some aspects, the base station 604 may transmit the temporal filter configuration 614 in an RRC message as part of CSI report setting. In some aspects, the base station 604 may transmit the temporal filter configuration 614 in dynamic signaling, such as DCI or downlink MAC CE. For example, the base station 604 may transmit the temporal filter configuration 614 as part of a message triggering aperiodic CSI reporting. In some aspects, the base station 604 may determine one temporal filter configuration at 612 for multiple UEs, and may transmit the temporal filter configuration to multiple UEs. For example, the base station 604 may transmit the temporal filter configuration in a group-common DCI or downlink MAC CE.

As illustrated at 622, the UE 602 may perform CSI measurements. The UE 402 may take measurements for different beams representative of the quality of the channel for that beam. For example, the UE 402 may measure the SINR, the RSRP, the RSSI, or the RSRQ for various beams.

As illustrated at 624, the UE 602 may generate CSI values for beams based on the CSI measurements and based on the temporal filter configuration 614. If the temporal filter configuration 614 indicates that a temporal filter should not be used, the UE 602 may generate the CSI values to be the raw CSI measurements. If the temporal filter configuration 614 identified a filter, the UE 602 may apply that filter to the CSI measurements and the relevant past CSI measurements or reported CSI values to generate the CSI values. If the temporal filter configuration 614 included a value to be used in the temporal filter, the UE 602 may apply the filter using that value.

Upon generating the CSI values for the beams, the UE 602 may transmit a CSI report 626 to the base station 604 and the base station 604 may receive the CSI report 626. The CSI report 626 includes CSI values generated at 624 based on the temporal filter configuration. The UE 602 may select a subset of the CSI values generated to be included in the CSI report 626 (e.g., may select the highest CSI values).

As illustrated at 632, the base station 604 may determine a beam selection for the UE 602. The base station 604 may select an uplink beam or may select a downlink beam for the UE 602 based on the CSI values for the beams in the CSI report 626. Where a temporal filter was applied to generate the CSI values, a beam that was experiencing a transient interference, resulting in a low CSI measurement at 622, may nonetheless have been included in the CSI report 626 due to the temporal filter causing past high CSI measurements to influence the beam's CSI value. The beam may be selected as an uplink beam or as a downlink beam in spite of the transient interference.

The base station 604 may apply a scheduling algorithm at 632 to determine which beam is selected. The scheduling algorithm may select multiple beams for multiple UEs based on the CSI values received from those UEs as well as other factors such as traffic statistics and history of packet errors. In some aspects, the scheduling algorithm applied may be based on the temporal filter configuration 614 transmitted to the UE 602. For example, the base station 604 may apply a first scheduling algorithm if the temporal filter configuration 614 indicated that the UE 602 should not apply a temporal filter and may apply a second, different scheduling algorithm if the temporal filter configuration 614 indicated that the UE 602 should apply a temporal filter. In some aspects, for example, the first scheduling algorithm and the second scheduling algorithm may include different coefficients in the proportionally fair (PF) scheduling algorithm.

Upon determining the beam selection for the UE 602 at 632, the base station 604 may transmit the beam selection 634 to the UE 602 and the UE 602 may receive the beam selection 634. As illustrated at 640, if the selected beam is selected as an uplink beam, the UE 602 may transmit uplink transmissions to the base station 604 on the beam identified in the beam selection 624 and the base station 604 may receive the uplink transmissions on the beam identified in the beam selection 624. If the selected beam is selected as a downlink beam, the base station 604 may transmit downlink transmissions to the UE 602 on the beam identified in the beam selection 624 and the UE 602 may receive the downlink transmissions on the beam identified in the beam selection 634.

Figure 7:
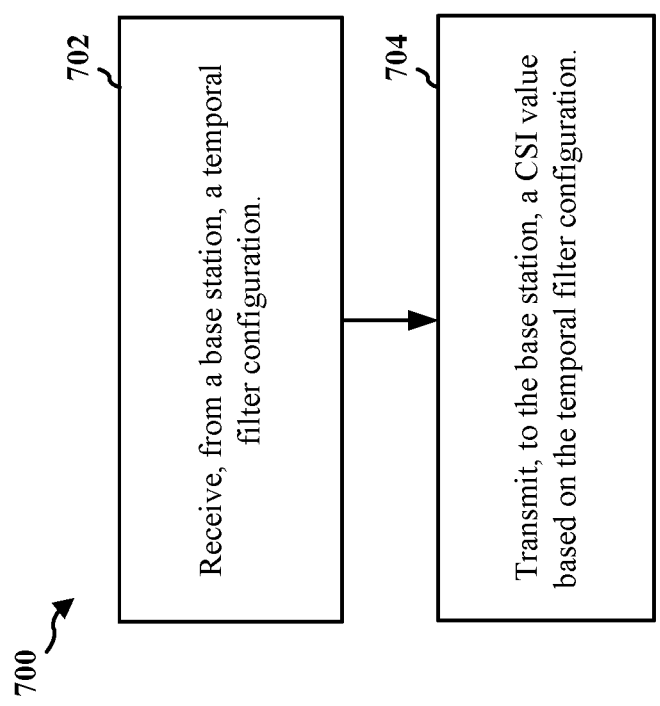
FIG. 7 is a flowchart of a method of wireless communication.

FIG. 7 is a flowchart 700 of a method of wireless communication. The method may be performed by a UE (e.g., the UE 104, 602; the apparatus 902).

At 702, the UE may receive, from a base station, a temporal filter configuration. The temporal filter configuration may be based on hybrid automatic repeat request (HARQ) reports of the UE, a rate of change in CSI values reported by the UE, a rate of change in channel quality information (CQI) values reported by the UE, or an uplink quality of the UE.

At 704, the UE may transmit, to the base station, a channel state information (CSI) value, the CSI value being based on the temporal filter configuration. Whether the UE applies a temporal filter to a CSI measurement to generate the CSI value may be based on the temporal filter configuration. The temporal filter configuration may identify a temporal filter and the UE may apply the identified temporal filter to a CSI measurement to generate the CSI value. Applying the temporal filter may include generating the CSI value based on the CSI measurement and a previous CSI measurement. The UE may be configured with a plurality of temporal filters, the temporal filter configuration may identify a temporal filter of the plurality of temporal filters, and the UE may apply the identified temporal filter to a CSI measurement to generate the CSI value.

The CSI value may be a signal to noise and interference ratio (SINR) value based on one or more SINR measurement or a reference signal received power (RSRP) value based on one or more RSRP measurement. Transmitting the CSI value may include transmitting a L1-signal to noise and interference ratio (SINR) report or a L1-reference signal received power (RSRP) report.

In some aspects, the UE may receive, from the base station, a beam selection based on the CSI value. The beam selection may be based on a first beam selection algorithm if the temporal filter configuration configures the UE to apply a temporal filter to generate the CSI value and may be based on a second beam selection algorithm if the temporal filter configuration configures the UE to report a CSI measurement as the CSI value without applying a temporal filter.

In some aspects, transmitting the CSI value may include transmitting a CSI report, and the UE may select a beam corresponding to the CSI value from a plurality of beams for inclusion in the CSI report based on the CSI value.

Figure 8:
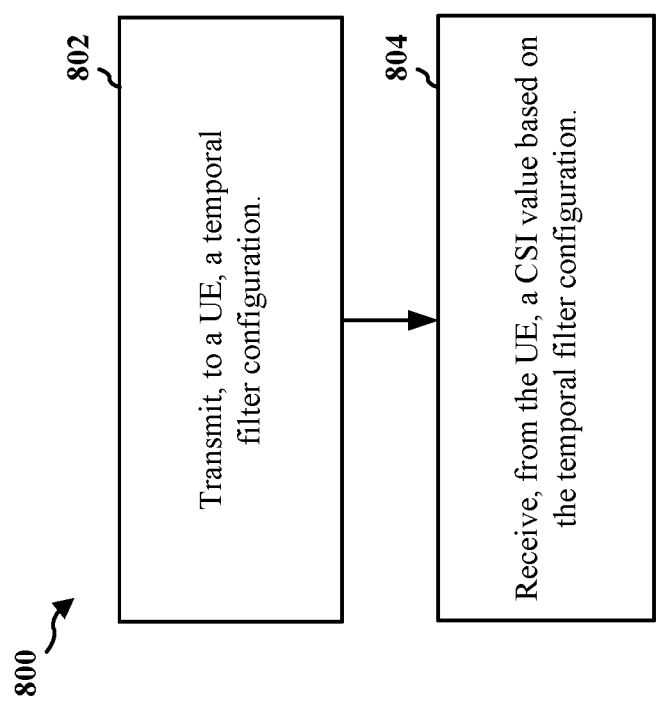
FIG. 8 is a flowchart of a method of wireless communication.

FIG. 8 is a flowchart 800 of a method of wireless communication. The method may be performed by a base station (e.g., the base station 102/180, 604; the apparatus 1002.

At 802, the base station may transmit, to a user equipment (UE), a temporal filter configuration. The temporal filter configuration may be based on hybrid automatic repeat request (HARQ) reports of the UE, a rate of change in CSI values reported by the UE, a rate of change in channel quality information (CQI) values reported by the UE, or an uplink quality of the UE.

At 804, the base station may receive, from the UE, a channel state information (CSI) value, the CSI value being based on the temporal filter configuration. Whether the CSI value is based on a temporal filter may be based on the temporal filter configuration. The temporal filter configuration may identify a temporal filter and the CSI value may be generated by applying the temporal filter to a CSI measurement. Applying the temporal filter may include generating the CSI value based on the CSI measurement and a previous CSI measurement. The UE may be configured with a plurality of temporal filters, the temporal filter configuration may identify a temporal filter of the plurality of temporal filters, and the CSI value may be generated by applying the identified temporal filter to a CSI measurement.

The CSI value may be a signal to noise and interference ratio (SINR) value based on one or more SINR measurement or a reference signal received power (RSRP) value based on one or more RSRP measurement. Transmitting the CSI value may include transmitting a L1-signal to noise and interference ratio (SINR) report or a L1-reference signal received power (RSRP) report.

In some aspects, the base station may transmit, to the UE, a beam selection based on the CSI value. The beam selection may be based on a first beam selection algorithm if the temporal filter configuration configures the UE to apply a temporal filter to generate the CSI value and may be based on a second beam selection algorithm if the temporal filter configuration configures the UE to report a CSI measurement as the CSI value without applying a temporal filter.

Figure 9:
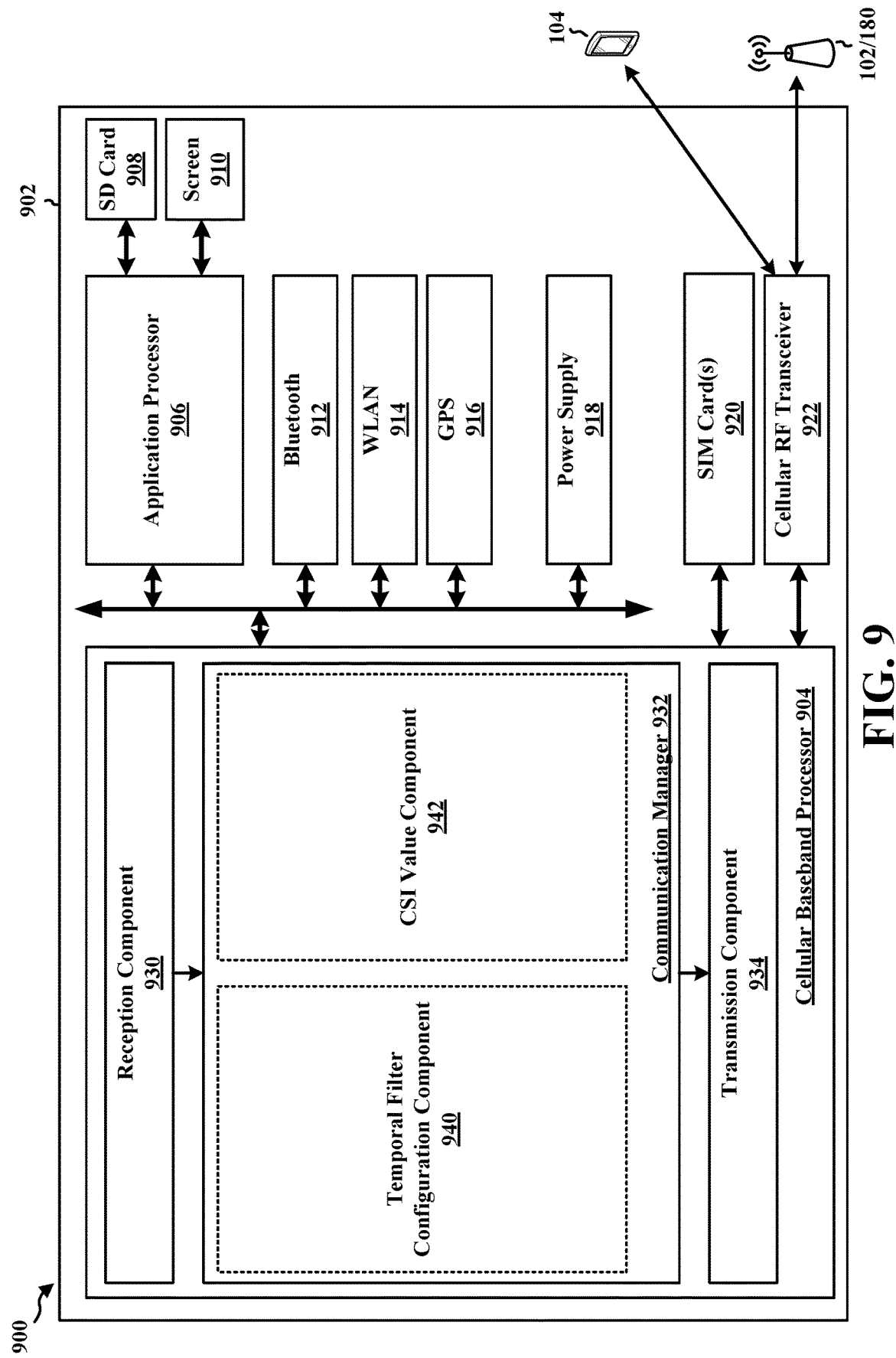
FIG. 9 is a diagram illustrating an example of a hardware implementation for an apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The communication manager 932 includes a temporal filter configuration component 940 that is configured to receive, from a base station (such as base station 102/180), a temporal filter configuration, e.g., as described in connection with 702 of FIG. 7. The communication manager 932 further includes a CSI value component 942 that receives input in the form of instructions for determining a CSI value from the temporal filter configuration component 940, based on the received temporal filter configuration, and is configured to determine a CSI value based on the instructions and transmit, to the base station, the CSI value, the CSI value being based on the temporal filter configuration, e.g., as described in connection with 704 of FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving, from a base station, a temporal filter configuration and means for transmitting, to the base station, a CSI value, the CSI value being based on the temporal filter configuration. The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
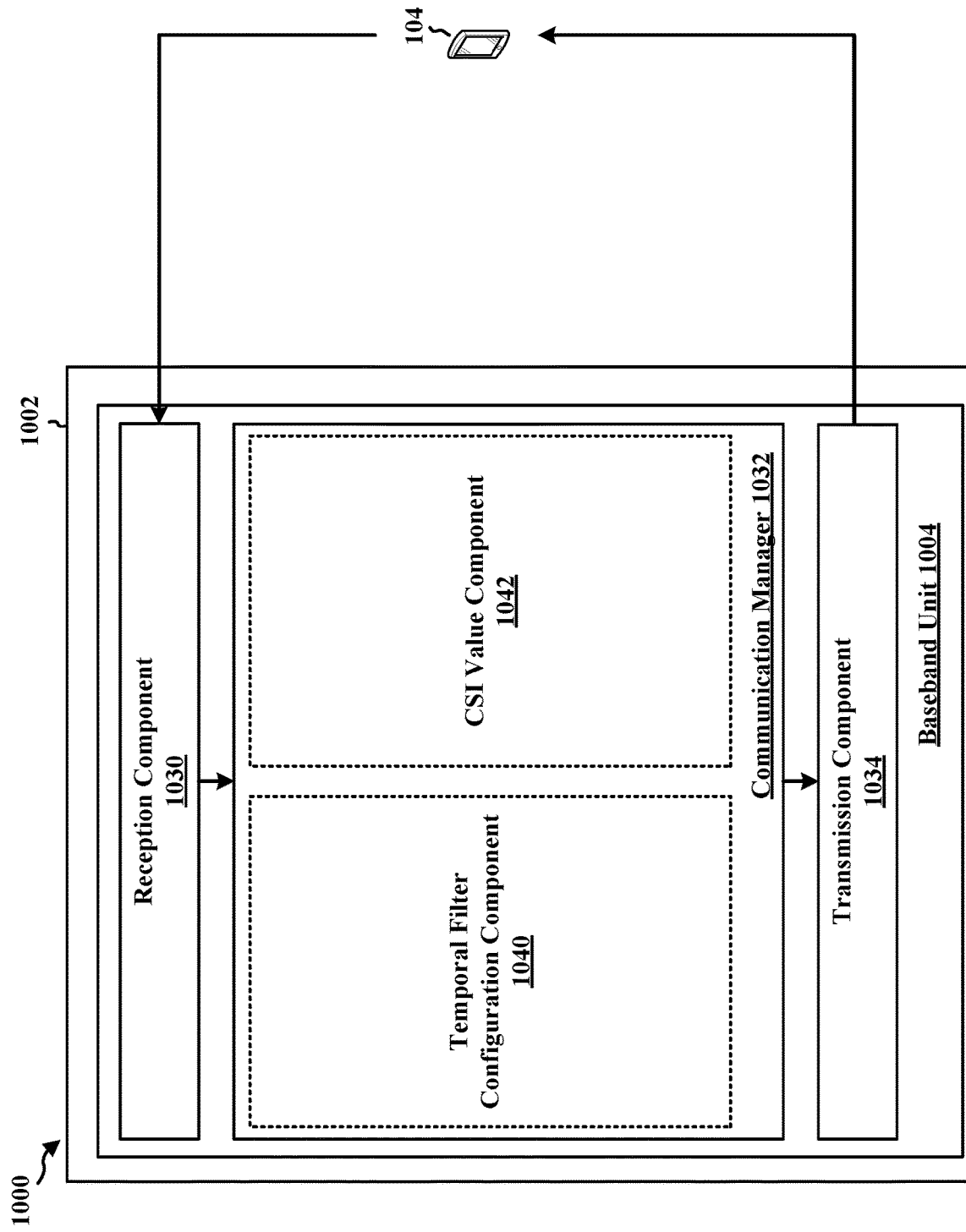
FIG. 10 is a diagram illustrating an example of a hardware implementation for an apparatus.

FIG. 10 is a diagram 1000 illustrating an example of a hardware implementation for an apparatus 1002. The apparatus 1002 is a BS and includes a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes a temporal filter configuration component 1040 that transmits, to a UE (such as UE 104), a temporal filter configuration, e.g., as described in connection with 802 of FIG. 8. The communication manager 1032 further includes a CSI value component 1042 that receives, from the UE, a CSI value based on the temporal filter configuration, e.g., as described in connection with 804 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for transmitting, to a UE, a temporal filter configuration and means for receiving, from the UE, a CSI value based on the temporal filter configuration. The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Implementation examples are described in the following numbered clauses. The following examples are illustrative only and may be combined with aspects of other embodiments or teachings described herein, without limitation.

1. A method of wireless communication at a user equipment (UE), comprising: receiving, from a base station, a temporal filter configuration; and transmitting, to the base station, a channel state information (CSI) value, the CSI value being based on the temporal filter configuration.

2. The method of clause 1, wherein whether the UE applies a temporal filter to a CSI measurement to generate the CSI value is based on the temporal filter configuration.

3. The method of any of clauses 1-2, wherein the temporal filter configuration identifies a temporal filter and the UE applies the identified temporal filter to a CSI measurement to generate the CSI value.

4. The method of any of clauses 1-3, wherein applying the temporal filter comprises generating the CSI value based on the CSI measurement and a previous CSI measurement.

5. The method of any of clauses 1-4, wherein the UE is configured with a plurality of temporal filters, the temporal filter configuration identifies a temporal filter of the plurality of temporal filters, and the UE applies the identified temporal filter to a CSI measurement to generate the CSI value.

6. The method of any of clauses 1-5, wherein the CSI value is a signal to noise and interference ratio (SINR) value based on one or more SINR measurement or a reference signal received power (RSRP) value based on one or more RSRP measurement.

7. The method of any of clauses 1-6, wherein transmitting the CSI value comprises transmitting a L1-signal to noise and interference ratio (SINR) report or a L1-reference signal received power (RSRP) report.

8. The method of any of clauses 1-7, wherein the temporal filter configuration is based on hybrid automatic repeat request (HARQ) reports of the UE, a rate of change in CSI values reported by the UE, a rate of change in channel quality information (CQI) values reported by the UE, or an uplink quality of the UE.

9. The method of any of clauses 1-8, further comprising receiving, from the base station, a beam selection based on the CSI value.

10. The method of any of clauses 1-9, wherein the beam selection is based on a first beam selection algorithm if the temporal filter configuration configures the UE to apply a temporal filter to generate the CSI value and is based on a second beam selection algorithm if the temporal filter configuration configures the UE to report a CSI measurement as the CSI value without applying a temporal filter.

11. The method of any of clauses 1-10, wherein transmitting the CSI value comprises transmitting a CSI report, the method further comprising: selecting a beam corresponding to the CSI value from a plurality of beams for inclusion in the CSI report based on the CSI value.

12. An apparatus for wireless communication at a user equipment (UE), comprising: a memory; and at least one processor coupled to the memory and configured to: receive, from a base station, a temporal filter configuration; and transmit, to the base station, a channel state information (CSI) value, the CSI value being based on the temporal filter configuration.

13. The apparatus of clause 12, wherein whether the UE applies a temporal filter to a CSI measurement to generate the CSI value is based on the temporal filter configuration.

14. The apparatus of any of clauses 12-13, wherein the temporal filter configuration identifies a temporal filter and the UE applies the identified temporal filter to a CSI measurement to generate the CSI value.

15. The apparatus of any of clauses 12-14, wherein applying the temporal filter comprises generating the CSI value based on the CSI measurement and a previous CSI measurement.

16. The apparatus of any of clauses 12-15, wherein transmitting the CSI value comprises transmitting a CSI report, the at least one processor being further configured to: select a beam corresponding to the CSI value from a plurality of beams for inclusion in the CSI report based on the CSI value.

17. A method of wireless communication at a base station, comprising: transmitting, to a user equipment (UE), a temporal filter configuration; and receiving, from the UE, a channel state information (CSI) value, the CSI value being based on the temporal filter configuration.

18. The method of clause 17, wherein whether the CSI value is based on a temporal filter is based on the temporal filter configuration.

19. The method of any of clauses 17-18, wherein the temporal filter configuration identifies a temporal filter and the CSI value is generated by applying the temporal filter to a CSI measurement.

20. The method of any of clauses 17-19, wherein applying the temporal filter comprises generating the CSI value based on the CSI measurement and a previous CSI measurement.

21. The method of any of clauses 17-20, wherein the UE is configured with a plurality of temporal filters, the temporal filter configuration identifies a temporal filter of the plurality of temporal filters, and the CSI value is generated by applying the identified temporal filter to a CSI measurement.

22. The method of any of clauses 17-21, wherein the CSI value is a signal to noise and interference ratio (SINR) value based on one or more SINR measurement or a reference signal received power (RSRP) value based on one or more RSRP measurement.

23. The method of any of clauses 17-22, wherein transmitting the CSI value comprises transmitting a L1-signal to noise and interference ratio (SINR) report or a L1-reference signal received power (RSRP) report.

24. The method of any of clauses 17-23, wherein the temporal filter configuration is based on hybrid automatic repeat request (HARQ) reports of the UE, a rate of change in CSI values reported by the UE, a rate of change in channel quality information (CQI) values reported by the UE, or an uplink quality of the UE.

25. The method of any of clauses 17-24, further comprising transmitting, to the UE, a beam selection based on the CSI value.

26. The method of any of clauses 17-25, wherein the beam selection is based on a first beam selection algorithm if the temporal filter configuration configures the UE to apply a temporal filter to generate the CSI value and is based on a second beam selection algorithm if the temporal filter configuration configures the UE to report a CSI measurement as the CSI value without applying a temporal filter.

27. An apparatus for wireless communication at a base station, comprising: a memory; and at least one processor coupled to the memory and configured to: transmit, to a user equipment (UE), a temporal filter configuration; and receive, from the UE, a channel state information (CSI) value, the CSI value being based on the temporal filter configuration.

28. The apparatus of clause 27, wherein whether the CSI value is based on a temporal filter is based on the temporal filter configuration.

29. The apparatus of any of clauses 27-28, wherein the temporal filter configuration identifies a temporal filter and the CSI value is generated by applying the temporal filter to a CSI measurement.

30. The apparatus of any of clauses 27-29, wherein applying the temporal filter comprises generating the CSI value based on the CSI measurement and a previous CSI measurement.

What is claimed is:

1. A method of wireless communication at a user equipment (UE), comprising:
   receiving, from a base station, a temporal filter configuration;
   transmitting, to the base station, a channel state information (CSI) value, the CSI value being based on the temporal filter configuration; and
   receiving, from the base station, a beam selection based on the CSI value, wherein the beam selection is based on a first beam selection algorithm when the temporal filter configuration configures the UE to apply a temporal filter to generate the CSI value and is based on a second beam selection algorithm when the temporal filter configuration configures the UE to report a CSI measurement as the CSI value without applying a temporal filter.

2. The method of claim 1, wherein whether the UE applies a temporal filter to a CSI measurement to generate the CSI value is based on the temporal filter configuration.

3. The method of claim 1, wherein the temporal filter configuration identifies a temporal filter and the UE applies the identified temporal filter to a CSI measurement to generate the CSI value.

4. The method of claim 3, wherein applying the temporal filter comprises generating the CSI value based on the CSI measurement and a previous CSI measurement.

5. The method of claim 1, wherein the UE is configured with a plurality of temporal filters, the temporal filter configuration identifies a temporal filter of the plurality of temporal filters, and the UE applies the identified temporal filter to a CSI measurement to generate the CSI value.

6. The method of claim 1, wherein the CSI value is a signal to noise and interference ratio (SINR) value based on one or more SINR measurement or a reference signal received power (RSRP) value based on one or more RSRP measurement.

7. The method of claim 1, wherein transmitting the CSI value comprises transmitting a L1-signal to noise and interference ratio (SINR) report or a L1-reference signal received power (RSRP) report.

8. The method of claim 1, wherein the temporal filter configuration is based on hybrid automatic repeat request (HARQ) reports of the UE, a rate of change in CSI values reported by the UE, a rate of change in channel quality information (CQI) values reported by the UE, or an uplink quality of the UE.

9. The method of claim 1, wherein transmitting the CSI value comprises transmitting a CSI report, the method further comprising:
   selecting a beam corresponding to the CSI value from a plurality of beams for inclusion in the CSI report based on the CSI value.

10. An apparatus for wireless communication at a user equipment (UE), comprising:
    a memory; and
    at least one processor coupled to the memory and configured to:
      receive, from a base station, a temporal filter configuration;
      transmit, to the base station, a channel state information (CSI) value, the CSI value being based on the temporal filter configuration; and
      receive, from the base station, a beam selection based on the CSI value, wherein the beam selection is based on a first beam selection algorithm when the temporal filter configuration configures the UE to apply a temporal filter to generate the CSI value and is based on a second beam selection algorithm when the temporal filter configuration configures the UE to report a CSI measurement as the CSI value without applying a temporal filter.

11. The apparatus of claim 10, wherein whether the UE applies a temporal filter to a CSI measurement to generate the CSI value is based on the temporal filter configuration.

12. The apparatus of claim 10, wherein the temporal filter configuration identifies a temporal filter and the UE applies the identified temporal filter to a CSI measurement to generate the CSI value.

13. The apparatus of claim 12, wherein applying the temporal filter comprises generating the CSI value based on the CSI measurement and a previous CSI measurement.

14. The apparatus of claim 10, wherein transmitting the CSI value comprises transmitting a CSI report, the at least one processor being further configured to:
    select a beam corresponding to the CSI value from a plurality of beams for inclusion in the CSI report based on the CSI value.

15. A method of wireless communication at a base station, comprising:
    transmitting, to a user equipment (UE), a temporal filter configuration;
    receiving, from the UE, a channel state information (CSI) value, the CSI value being based on the temporal filter configuration; and
    transmitting, to the UE, a beam selection based on the CSI value, wherein the beam selection is based on a first beam selection algorithm when the temporal filter configuration configures the UE to apply a temporal filter to generate the CSI value and is based on a second beam selection algorithm when the temporal filter configuration configures the UE to report a CSI measurement as the CSI value without applying a temporal filter.

16. The method of claim 15, wherein whether the CSI value is based on a temporal filter is based on the temporal filter configuration.

17. The method of claim 15, wherein the temporal filter configuration identifies a temporal filter and the CSI value is generated by applying the temporal filter to a CSI measurement.

18. The method of claim 17, wherein applying the temporal filter comprises generating the CSI value based on the CSI measurement and a previous CSI measurement.

19. The method of claim 15, wherein the UE is configured with a plurality of temporal filters, the temporal filter configuration identifies a temporal filter of the plurality of temporal filters, and the CSI value is generated by applying the identified temporal filter to a CSI measurement.

20. The method of claim 15, wherein the CSI value is a signal to noise and interference ratio (SINR) value based on one or more SINR measurement or a reference signal received power (RSRP) value based on one or more RSRP measurement.

21. The method of claim 15, wherein transmitting the CSI value comprises transmitting a L1-signal to noise and interference ratio (SINR) report or a L1-reference signal received power (RSRP) report.

22. The method of claim 15, wherein the temporal filter configuration is based on hybrid automatic repeat request (HARQ) reports of the UE, a rate of change in CSI values reported by the UE, a rate of change in channel quality information (CQI) values reported by the UE, or an uplink quality of the UE.

23. An apparatus for wireless communication at a base station, comprising:
a memory; and
at least one processor coupled to the memory and configured to:
transmit, to a user equipment (UE), a temporal filter configuration;
receive, from the UE, a channel state information (CSI) value, the CSI value being based on the temporal filter configuration; and
transmitting, to the UE, a beam selection based on the CSI value, wherein the beam selection is based on a first beam selection algorithm when the temporal filter configuration configures the UE to apply a temporal filter to generate the CSI value and is based on a second beam selection algorithm when the temporal filter configuration configures the UE to report a CSI measurement as the CSI value without applying a temporal filter.

24. The apparatus of claim 23, wherein whether the CSI value is based on a temporal filter is based on the temporal filter configuration.

25. The apparatus of claim 23, wherein the temporal filter configuration identifies a temporal filter and the CSI value is generated by applying the temporal filter to a CSI measurement.

26. The apparatus of claim 25, wherein applying the temporal filter comprises generating the CSI value based on the CSI measurement and a previous CSI measurement.

* * * * *